United States Patent [19]

D'Amore et al.

[11] Patent Number: 4,935,574
[45] Date of Patent: Jun. 19, 1990

[54] PREPARATION OF PARA-XYLENE BY TOLUENE METHYLATION

[75] Inventors: Michael B. D'Amore, Wilmington; Nutan K. Pande, Hockessin, both of Del.

[73] Assignee: E. I. Du Pont de Nemours and Company, Wilmington, Del.

[21] Appl. No.: 325,612

[22] Filed: Mar. 13, 1989

Related U.S. Application Data

[62] Division of Ser. No. 174,944, Mar. 29, 1988, Pat. No. 4,843,057.

[51] Int. Cl.⁵ ................................................ C07C 2/68
[52] U.S. Cl. .................................................... 585/467
[58] Field of Search .......................................... 585/467

[56] References Cited

U.S. PATENT DOCUMENTS

| | | | |
|---|---|---|---|
| 4,444,989 | 4/1984 | Herkes | 585/467 |
| 4,520,220 | 5/1985 | Watson et al. | 585/467 |
| 4,740,649 | 4/1988 | Chu et al. | 585/467 |
| 4,758,327 | 7/1988 | Young | 585/467 |
| 4,758,328 | 7/1988 | Young | 585/467 |
| 4,774,379 | 9/1988 | Butter et al. | 585/467 |

*Primary Examiner*—Curtis R. Davis

[57] ABSTRACT

A silica catalyst that retains its high initial activity for a longer time is obtained by forming the catalyst from an aquasol that was obtained by mixing an alkali metal aluminate with an aqueous solution of alkali metal silicate.

6 Claims, No Drawings

PREPARATION OF PARA-XYLENE BY TOLUENE METHYLATION

REFERENCES TO PRIOR APPLICATION

This application is a division of U.S. application Ser. No. 7/174,944 filed Mar. 29, 1988 now U.S. Pat. No. 4,843,057.

FIELD OF THE INVENTION

This invention relates to a process for the preparation of a silica catalyst that retains its high initial activity for an increased time period. More particularly this invention relates to a process for preparing a silica catalyst that may be used for hydrocarbon conversion, such as in the preparation of para-xylene by methylation of toluene, to the catalyst so prepared, and to the process of preparing para-xylene by methylation of toluene.

BACKGROUND OF THE INVENTION

Various silica catalysts for the preparation of para-xylene by methylation of toluene are known, for example U.S. Pat. No. 4,283,306 to Herkes discloses such catalysts, and Dwyer et al. U.S. Re. Pat. No. 29,948 and Flanigan et al. U.S. Pat. No. 4,073,865 disclose similar hydrocarbon conversion catalysts. Mobil Oil Company sells catalyst of this type under the designation ZSM-5.

Such catalysts are prepared, for example see Herkes '306 patent, by a series of steps which includes mixing colloidal silica aquasol with a template compound, forming a solid crystalline product, and eventually activating the solid crystalline product by heating. Numerous other steps are or may be included in the process, for example seed crystals of silica may be added to the mixture of aquasol and template compound to influence the formation of a solid crystalline product, the solid crystalline product may be ion exchanged, the ion exchanged product may be mixed with a promoter, the solid product may be formed into pellets, and the pellets may be coated.

SUMMARY OF THE INVENTION

The present invention is an improvement in process for the preparation of silica catalysts and produces a catalyst that retains its high initial activity for a longer time than other catalysts of this type. The present invention also includes the catalyst made by the process, and the process of using the catalyst to form para-xylene by methylation of toluene.

According to the Herkes '306 patent, see especially column 2 line 4-10, he found an excellent crystalline silica catalyst that contains substantially no aluminum for the specific process of methylating toluene to produce xylene. It has now been found that the presence of aluminum in such catalysts is often desirable, and that it is possible to prolong the initial high rate of catalytic activity by adding aluminum to such catalysts at a particular stage in its formation, namely prior to the stage where the initial colloidal silica aquasol is formed.

The present invention is an improvement in the process of preparing a silica catalyst. The improvement is using as the colloidal silica aquasol that is mixed with the template compound, an aquasol made from an aqueous mixture obtained by combining an alkali metal aluminate with an aqueous solution of alkali metal silicate.

The colloidal silica aquasol is made by mixing alkali metal aluminate with an aqueous solution of alkali metal silicate, and then forming the colloidal silica aquasol. The amount of alkali metal aluminate employed should be sufficient that the alumina content in the final product is in the range of about 700 to 5000 parts per million. Any alkali metal aluminate and any alkali metal silicate may be employed, but for economic reasons sodium or potassium compounds are most desirable. A satisfactory way of forming the aquasol from the aqueous mixture of alkali metal aluminate and alkali metal silicate is by treating the mixture with an ion exchange resin. Such a treatment will remove the alkali metal ions from the solution and the aquasol will be formed. Numerous different ion exchange resins may be employed. The amount or particle size of the ion exchange resin is not critical, but the amount should be sufficient to remove the majority of the alkali metal ions from the solution, and the particle size should be such that the resin can be readily removed from the aquasol, for example by filtration. Preferably the amount of resin employed is greater than that stoichiometrically necessary to remove the alkali metal ions.

After the aquasol is formed the further steps of catalyst preparation are those conventionally employed, such as those shown in the examples of Herkes '306 patent.

In the following Example, all parts and percentages are in parts by weight unless otherwise specified.

EXAMPLE 1

AQUASOL PREPARATION

A reactor vessel fitted with stirrer paddles was charged with 1000 ml of water and heated to 70° C. To the reactor there was added separately at constant rates 900 ml of F grade sodium silicate and 54 ml of a 2% solution of sodium aluminate trihydrate($Na_2O \cdot Al_2O_3 \cdot 3H_2O$) while stirring vigorously such that the addition of both was begun and completed simultaneously. F grade sodium silicate is an aqueous solution of sodium silicate with a $SiO_2/Na_2O$ weight ratio of 3.25 and a concentration of 28.4 weight percent silica. Cationic ion exchange resin, Amberlite IRC 84-S in the H+ form was added in measured amounts throughout the run to maintain a pH of 9.2±0.2. At this point a dilute sol of extremely small silica particles is formed. Amberlite IRC-84-S is a weak-acid carboxylic methacrylate cation exchange resin available from Rohm & Haas Company of Philadelphia, Pa. Measurement of pH was done continuously at room temperature with a glass electrode by circulating part of the mixture through a cooler.

At the end of the addition, the product was filtered to separate the resin from the aquasol. The product filtrate contained about 14% $SiO_2$.

The above procedure was repeated to make a second batch which after combining with the first was evaporated to about 30% $SiO_2$.

The evaporated product contained 588 ppm $Al_2O_3$.

CATALYST PREPARATION

Crystalline silica catalyst was prepared from the following reactants:

| | |
|---|---|
| $(C_2H_5)_4NBr$ | 70.3 |
| NaOH | 29.5 |
| $H_2O$ | 147 |
| 30% $SiO_2$ | 1162.5 |
| Previously Prepared Crystalline Silica Seed | 18.3 |

The 30% SiO₂ was prepared by the procedure set forth above and contained 588 ppm Al₂O₃ and small amounts of sodium impurity.

An aqueous solution of the (C₂H₅)₄NBr and the NaOH was mixed vigorously for 60 minutes at room temperature with the colloidal silica. This resulting mixture was charged to a 2 liter 316 Stainless Steel autoclave. The seed crystals were added, the autoclave sealed and the temperature of the contents was raised to 150° C. at 10°/min with slow(100 RPM) stirring and held at 150° C. for 24 hrs with slow stirring following which the slurry was discharged from the autoclave and filtered.

The solid crystalline product on the filter was washed with water to remove unreacted salts and soluble reactants and was then dried at 95° C.

This crystalline silica was calcined in air by heating in a furnace which was raised to 550° C. at 1°/min and held at 550° C. for 7 hrs. X-ray analyses established the material as 100% crystalline silica with a diffraction pattern identical to that reported in U.S. Pat. No. 4,283,306, Table A and having a peak to background ratio at d(Å)=3.85±0.05 of 47. Analysis of the calcined sample indicated it contained 1760 ppm Al2O3.

The calcined product was exchanged with ammonium by contacting two successive times at 95° C. with 10% NH₄NO₃ solution (1 gram per 10 grams of crystalline silica), first for 4 hours and then for 16 hours. The catalyst precursor was then filtered, washed with H2O, dried at 95° C. and calcined (activated) in air in a furnace which was raised to 550° C. at 1°/min and held at 550° C. for 7 hrs.

PELLET FORMATION

A 80:20 wt:wt % mixture consisting of 35 g of this crystalline silica and 8.75 bentonite clay (Bentolite-L) were intimately dry mixed for 1 hour on a roller mill. The powder was mixed with water to make a pasty dough and molded into ⅛ inch pellets. The pellets were dried at 95° C. followed by calcination at 550° C. for 7 hrs following a slow heat up from room temperature at 1° C./min.

An amount of 10 gram of pellets was soaked for 2 hrs in 50 ml of a 34% (v/v) ethylorthosilicate solution in toluene. After draining off the excess liquid, the sample was placed in a 100% humidity chamber on a screen for 4 hrs. It was then transferred to a quartz boat and calcined at 550° C. for 7 hrs following a slow heat up from room temperature at 1° C./min.

The promoted catalyst was then soaked for 4 hrs in a 4/16 vol/vol mixture of Conc HNO₃/H₂O. After draining off the excess liquid the sample was washed three times with excess water by soaking for 1 hr each wash. After the last wash it was transferred to a quartz boat and calcined at 550° C. for 7 hrs following a slow heat up from room temperature at 1° C./min.

CATALYST ACTIVITY

The pelletized catalyst obtained was tested for retention of activity against two catalysts formed by conventional techniques.

An amount as indicated in Table 1 of the catalysts were each placed in a 0.5 inch internal diameter 316 Stainless Steel reactor inserted in a heated fluidized sand bath and employed in methylation of toluene to para-xylene. A 10/1 mole ratio of toluene to methanol, together with a concurrent water feed in a mole ratio of H₂O to hydrocarbon (HC) of 1.00 was passed over the catalysts at 344 kPa (3.4 atm). The reactions were conducted at 480° C. and at high enough weight hour space velocity (WHSV) to limit methanol conversion to less than 70%. The results expressed in para-xylene production rate in the units of moles of p-xylene produced per kilogram of catalyst per hour are summarized in Table 1.

TABLE 1

| Example | Alumina content in parts/million | Grams Used | WHSV (Hr-1) | Para-Xylene Production Rate (mole/Kg-Hr) at time t(Hr) | | | | | | |
|---|---|---|---|---|---|---|---|---|---|---|
| | | | | 0 | 500 | 1000 | 1500 | 2000 | 2500 | 3000 |
| Control Ex. A[xx] | 700 | 5 | 40 | 15.0 | 14.2 | 13.5 | 12.8 | 12.2[x] | 11.6[x] | 11.0[x] |
| Control Ex. B[xxx] | 2100 | 2 | 100 | 45.0 | 33.3 | 24.7 | 22.3 | 20.1 | 18.1 | 16.3 |
| Ex. 1 | 1760 | 2 | 100 | 37.5 | 33.9 | 30.5 | 27.4 | 24.7 | 22.2 | 20.0 |

[x]extrapolated data.
[xx]A catalyst made from colloidal silica which was made from an alkali metal silicate which contained aluminum as an impurity.
[xxx]A catalyst in which the silicate starting material is made by adding sodium aluminate tetrahydrate to a dispersion of colloidal silica in water.

We claim:

1. A process for the preparation of para-xylene by the methylation of toluene which comprises using as the catalyst, a catalyst obtained by mixing colloidal silica aquasol formed from an aqueous mixture obtained by combining an alkali metal aluminate with an aqueous solution of an alkali metal silicate, with a template compound, followed by formation of a solid crystalline product, and eventual activation of the crystalline product by heating.

2. The process of claim 1 in which the materials fed to the process are toluene, methanol, and water.

3. The process of claim 2 in which the reaction is conducted at about 480° C. and at a weight hour space velocity high enough to limit the methanol conversion to less than 70%.

4. The process of claim 3 in which the mole ratio of toluene to methanol is about 10 to 1, and in which the mole ratio of water to hydrocarbon in the feed is about 1.

5. The process of claim 1 in which the alkali metal aluminate is sodium aluminate trihydrate.

6. The process of claim 1 in which the catalyst has an alumina content in the range of 700 to 5000 parts per million.

* * * * *